(12) United States Patent
Elam

(10) Patent No.: US 7,185,851 B2
(45) Date of Patent: Mar. 6, 2007

(54) INFLATABLE AERODYNAMIC WING AND METHOD

(75) Inventor: Daryl B. Elam, Benson, AZ (US)

(73) Assignee: Raytheon Co., Waltham, MA (US)

( * ) Notice: Subject to any disclaimer, the term of this patent is extended or adjusted under 35 U.S.C. 154(b) by 184 days.

(21) Appl. No.: 10/927,579

(22) Filed: Aug. 26, 2004

(65) Prior Publication Data

US 2006/0060706 A1    Mar. 23, 2006

(51) Int. Cl.
*B64C 1/00* (2006.01)
*E04B 1/34* (2006.01)

(52) U.S. Cl. .............. 244/123.11; 244/35 R; 52/2.11; 52/2.13; 52/2.22; 52/2.23

(58) Field of Classification Search ........ 244/123, 244/128, 35 R, 123.11; 52/2.11, 2.1; 5/710
See application file for complete search history.

(56) References Cited

U.S. PATENT DOCUMENTS

| | | | |
|---|---|---|---|
| 2,979,287 A * | 4/1961 | Ross | 244/219 |
| 3,463,420 A * | 8/1969 | Carter et al. | 244/46 |
| 3,957,232 A | 5/1976 | Sebrell | |
| 4,102,519 A | 7/1978 | Crosby, Jr. | |
| 4,261,534 A | 4/1981 | Roselli | |
| 4,533,099 A | 8/1985 | Stewart | |
| 4,582,278 A | 4/1986 | Ferguson | |
| 4,725,021 A | 2/1988 | Priddy | |
| 4,858,854 A | 8/1989 | Jacobson | |
| 5,244,169 A | 9/1993 | Brown et al. | |
| 5,299,827 A | 4/1994 | Igawa | |
| 5,681,010 A | 10/1997 | Jensen | |
| 6,082,667 A | 7/2000 | Haggard | |
| 6,199,796 B1 * | 3/2001 | Reinhard et al. | 244/35 R |
| 6,460,209 B1 * | 10/2002 | Reeder et al. | 5/690 |

* cited by examiner

*Primary Examiner*—J. Woodrow Eldred
(74) *Attorney, Agent, or Firm*—Renner, Otto, Boisselle & Sklar, LLP

(57) ABSTRACT

An inflatable structure constructed of flexible material that can occupy a minimal volume when in a deflated and stored condition as compared to its fully inflated and deployed configuration, has sufficient structural rigidity to function as a wing when deployed. The wing includes an array of inflatable chambers with generally circular cross-sections. The chambers are spaced a particular distance between their centers and held in that spacing by an outer wing skin. For equal cross-sectional diameter chambers this distance is less than the diameter. When the chambers are inflated the close spacing causes tension in the opposing surfaces to create a rigid structure.

32 Claims, 3 Drawing Sheets

INFLATABLE AERODYNAMIC WING AND METHOD

The inventor developed this invention in cooperation with a department for the U.S. Government; therefore, the U.S. Government might have certain rights to this invention.

FIELD OF THE INVENTION

The present invention is related to an aerial vehicle having wings that are stowable and can be deployed as lifting surfaces for flight, and in particular, to an inflatable wing structure and method for deploying such a structure.

BACKGROUND

An aerial vehicle, such as a missile, projectile or unmanned aerial vehicle (UAV), typically is launched from either a tube or a rail. Such a vehicle is very difficult to launch ballistically (i.e. without wings functioning as primary lifting surfaces), and then later in the flight to deploy wings that can function as primary lifting surfaces for non-ballistic flight.

Past attempts to provide wings or wing structures that can be deployed during flight have included traditional wing structures that unfold or swivel out from an envelope within a fuselage portion of the vehicle. Other past attempts include dividing traditional wing structures into folding sub-panels, either spanwise or chordwise, for more volumetrically efficient storage in the space available within the fuselage in the ballistic flight configuration. These wing structures are typically retracted into the fuselage of the vehicle using various pivots, hinges and sliding mechanisms, and generally also require intricate mechanisms for folding, deploying and operating the wing structure. In general, these past attempts often have resulted in wing structures that are complex, have problems with reliability, are expensive, and due to volume constraints in the fuselage these wing structures are limited in the maximum wing surface that they can provide. This latter problem is most evident when relatively low flight speeds are desired.

Relatively low flight speeds generally require larger wing surfaces to provide enough lift to sustain the aerial vehicle's flight. Because of these size requirements, it is often difficult to store these wing structures within the fuselage. When stored, these wing structures generally consume a volume that is the same as or greater than the volume they consume when they are deployed. As the size of the aerial vehicle is reduced, it becomes increasingly difficult and inefficient to store the wing structures within the fuselage.

Since the wing size is limited by the available storage space within the fuselage, these collapsible wing structures generally only support aerial vehicles traveling at relatively high flight speeds. These higher flight speeds result in greater forces acting on the wing structures during flight, however, which in turn increases the structural requirements necessary to support the increased forces acting on the wing structures.

Previous attempts at making folding wings for non-ballistically launched aerial vehicles typically required traditional reinforcing structures such as trusses and spars inside the wing structure, while also using hinges or pinned joints for folding or stowing the wing structure. This often was due to the larger wing area required for a non-ballistic take-off from the ground. In many cases these wing structures were deployed by personnel on the ground using equipment that was not part of the vehicle. The vehicle typically was then activated to take off from a runway like a conventional airplane.

Previous attempts to make collapsible wing structures also have included inflatable wing structures. For strength and stability, however, prior inflatable wings often relied on external brace wires, struts or traditional internal structures, such as trusses and spars. In most of these designs, especially where the additional structures were minimal, the wing surfaces were not truly fair and smooth.

These inflatable wing structures also often were designed with inflatable truss, spar and rib equivalents as substitutes for the non-inflatable structures that they were intended to replace. These inflatable substitutes did not have the same rigidity and stiffness as the non-inflatable components that they were intended to replace, however, and therefore did not perform as well as their conventional stiff wing structure equivalents.

One particular inflatable wing included multiple inflatable spanwise chambers with a soft foam rubber-like material to fill in the spaces between the inflatable chambers and cloth coverings to provide a smooth airfoil surface. Another inflatable wing used helically-wound fibers around rubber tubes that were inflated with several hundred pounds per square inch of pressure. Again, a soft foam rubber-like material provided a smooth airfoil surface. The foam limited the collapsed volume of these wing structures, however. Their deployed versus stowed volume ratios are estimated to be on the order of 4:1 up to 12:1.

SUMMARY

The present invention provides an inflatable wing structure that does not depend on non-inflatable external or internal structures for support or rigidity. Instead of replacing conventional wing structures with inflatable components, the inflatable wing of the present invention uses internal pressure in closely spaced chambers to provide a rigid wing structure. Instead of external or internal conventional structures to support the inflatable wing structure, the inflatable wing is constructed of flexible materials. Inflatable chambers within and including a wing envelope form the wing structure without any fillers or nonstructural elements. The inflatable chambers are spaced close together and held in place by the wing skin, which in turn is placed under tension to provide a smooth wing surface. When the chambers are inflated, they press against each other and form a rigid structure. When the chambers are deflated, however, they can be stored within a relatively small volume, such as an envelope in the fuselage of an aerial vehicle. Preliminary estimates are that the deployed volume versus the stowed volume ratio is approximately 20:1 to 35:1.

Specifically, the present invention provides an inflatable wing that includes an array of inflatable chambers and at least two opposing surfaces bounding the array. Each chamber has a generally circular lateral cross-section. At least two opposing surfaces bounding the array. At least two of the inflatable chambers are attached to the opposing surfaces at attach points, and the chambers are spaced such that the distance between the center points of any two adjacent chambers is less than the sum of the perpendicular distance from the center point of each chamber to one of the opposing surfaces. For chambers that have the same diameter at their contact surfaces, the distance between their centers is less than the diameter.

The present invention also provides an aerial vehicle having a fuselage and such an inflatable wing mounted to the fuselage.

One embodiment provided by the present invention includes an aerial vehicle. The aerial vehicle has at least one inflatable wing, which has an array of airfoil-shape inflatable chambers and at least two opposing surfaces bounding the array and means for inflating the chambers. Each of the inflatable chambers is attached to the opposing surfaces at attach points, each chamber has a generally circular cross section, and the chambers are spaced such that the distance between the center points of any two adjacent chambers is less than the sum of the perpendicular distance from the center point of each chamber to one of the opposing surfaces. For chambers of equal adjacent diameters, this means spacing the chambers less than a diameter apart. The means for inflating the chambers includes a manifold that distributes a fluid to the inflatable chambers. The fluid includes a pressurized gas provided by at least one of a compressor, a chemical reaction, or a pyrotechnic gas generator, or a liquid that produces a flexible foam.

The present invention also provides an aerial vehicle including at least one inflatable wing formed from an array of inflatable chambers and a means for maintaining the alignment of the array of chambers with a particular spacing between adjacent chambers. The means for maintaining the array of inflatable chambers includes two opposing surfaces to which at least two of the chambers is attached.

Particular features of the invention can include one or more of the following:
- each chamber abutting an adjacent chamber forming an area contact surface when inflated.
- the distribution of the radii of generally circular cross-sections of at least one chamber can vary along the length of the chamber to form a line or a planar curve.
- the radii of the generally circular cross sections of at least one chamber can vary to form an aerodynamically desirable shape, such as an airfoil.
- the chordwise lengths of the chambers can include multiple lengths, which can provide a tapered wing shape, for example.
- the attach points can form a line contact between the chambers and each of the opposing surfaces.
- the distal ends of the opposing surfaces can come together to form a wing tip.
- a root end of the opposing surfaces can be connected to an airframe structure.
- the inflatable chambers and the opposing surfaces can be constructed of a flexible material, such as a nonporous fabric, plastic film, woven textile, an oriented-strand composite, non-oriented-strand composite or combinations thereof.
- the inflatable chambers can be constructed of more than one material.
- the opposing surfaces can be constructed of more than one material.
- the wing can include a manifold for distributing the fluid from a source to the array of inflatable chambers for inflating the chambers.
- the manifold connects the source of fluid to the chambers and can include a flexible tube.
- the wing can include a modulator for regulating the pressure provided to respective chambers.
- the wing can include multiple panels, each panel having at least two chambers.
- the multiple panels can be stacked end-to-end in a spanwise orientation.
- each of the multiple panels can have separate internal pressurization systems.
- the multiple panels can be mechanically connected.
- often at least one of the multiple panels is detachable.
- the multiple panels can be connected by a wire embedded in the two opposing surfaces, and when the wire is heated with an electrical current opposing surfaces can melt and thereby separate at least one of the multiple panels.
- a secondary wing and/or a movable control surface also can be formed of an inflatable wing structure as described above.
- a method of deploying an inflatable wing can include the following steps:
  a) releasing an inflatable wing with an array of inflatable chambers, and b) inflating the chambers, wherein at least two of the inflatable chambers are attached to opposing surfaces at attach points, and the chambers are spaced such that the distance between the center points of any two adjacent chambers is less than the sum of the perpendicular distance from the center point of each chamber to one of the opposing surfaces.
- a method wherein the inflating step can include inflating the chambers with a gas or a foam.
- a method wherein the inflating step can include providing internal pressure to the chambers by at least one of a compressor, a chemical reaction, a pyrotechnic gas generator or a liquid that produces a flexible foam.
- such a method can include a step of selectively modulating the pressure in respective chambers, although once the chambers are pressurized to a minimum pressure, the wing can be extended and will remain extended throughout flight.

Devices built in accordance with the present invention are not limited to wings for aerial vehicles. Accordingly, the present invention also provides an inflatable beam that has an array of inflatable chambers and at least two opposing surfaces, where at least two of the inflatable chambers are attached to the opposing surfaces at attach points. The chambers are spaced such that the distance between the center points of any two adjacent chambers is less than the sum of the perpendicular distance from the center point of each chamber to one of the opposing surfaces. This leads to a wing with pressurized chambers between opposing surfaces that are in tension, which helps to create a smooth wing surface without any additional elements.

The foregoing and other features of the invention are hereinafter fully described and particularly pointed out in the claims, the following description and annexed drawings setting forth in detail a certain illustrative embodiment of the invention, this embodiment being indicative, however, of but one of the various ways in which the principles of the invention may be employed.

DETAILED DESCRIPTION

Figure 1:
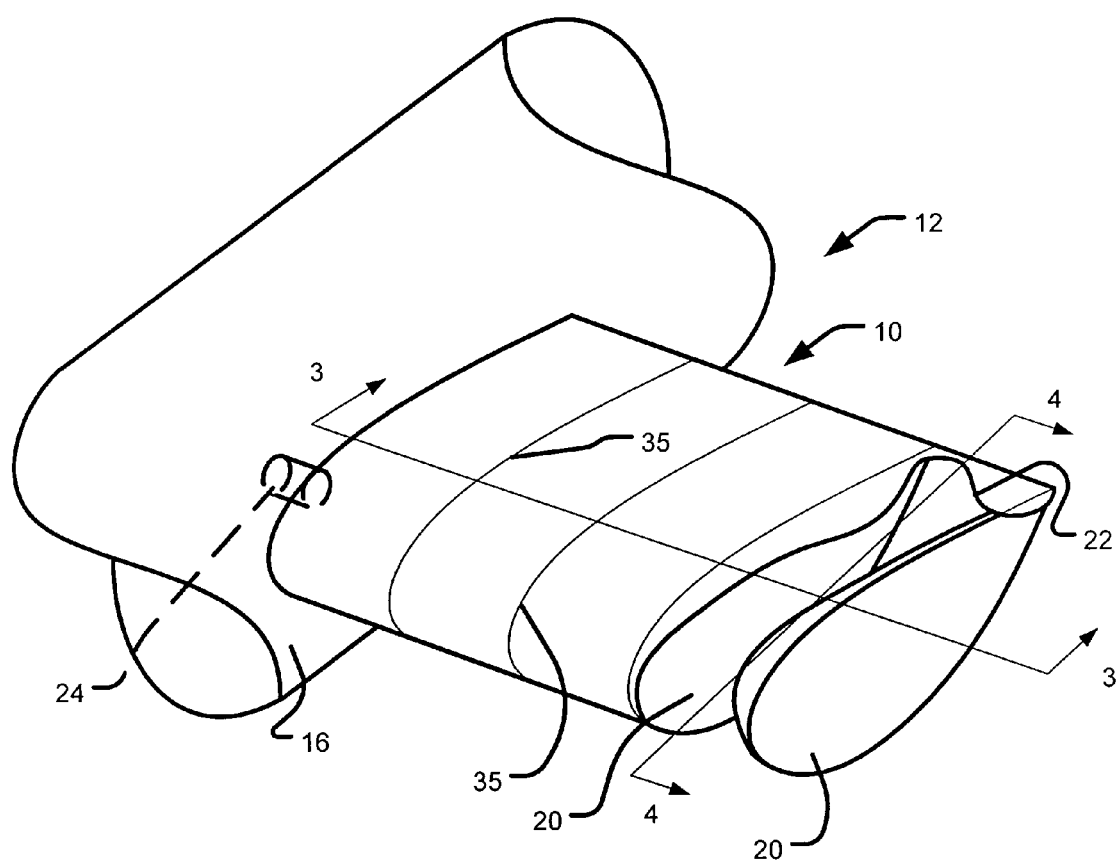
FIG. 1 is a perspective view of a portion of an aerial vehicle having inflatable wings in accordance with the present invention, with a portion of the wing skin removed to show the inflatable chambers therein.

Referring initially to FIG. 1, the present invention provides an inflatable structure that can be used, for example, as the wing 10 of an aerial vehicle 12. The wing structure 10 occupies a minimal volume when in a deflated and stowed configuration, in comparison to the deployed and fully inflated configuration shown in FIG. 1. The wing structure 10 is connected to a fuselage 16 of the aerial vehicle 12.

This inflatable wing structure 10 does not depend on conventional, non-inflatable external or internal structures for support or rigidity. Instead of simply replacing conventional wing structures with inflatable components, the inflatable wing structure 10 provided by the present invention uses internal pressure in an array of closely spaced chambers 20 held together by a wing skin 22 to provide a rigid wing constructed of flexible materials.

A manifold 24 distributes fluid, typically pressurized gas, to the chambers 20 to provide the pressure to extend the wing 10 and maintain the rigid structure. So long as compressive skin stresses of bending forces due to aerodynamic and inertial loads do not exceed the expansion tension stresses from the internal pressure in the chambers 20, the wing structure 10 will remain substantially structurally stable.

When the chambers 20 are deflated, the wing 10 can be stored within a small volume contained within or attached to the fuselage 16 of the vehicle 12. The wing 10 is deployed by releasing it from its stowed configuration and inflating the chambers 20.

The inflatable chambers 20 are spaced close together, such that when they are inflated, they exert pressure on each other. The result is an unbalanced internal pressure in a wing root chamber (adjacent the fuselage 16) and a wing tip chamber (not shown) at a distal end of the wing structure 10. This restricted spacing of the chambers 20 creates a spanwise expansive force, which, when constrained by the wing skin 22, gives the structure its rigidity. The wing 10 typically is attached to the fuselage 16 of the aerial vehicle 12 through a suitable connection with the wing skin 22 or the root chamber (not shown).

Figure 2:
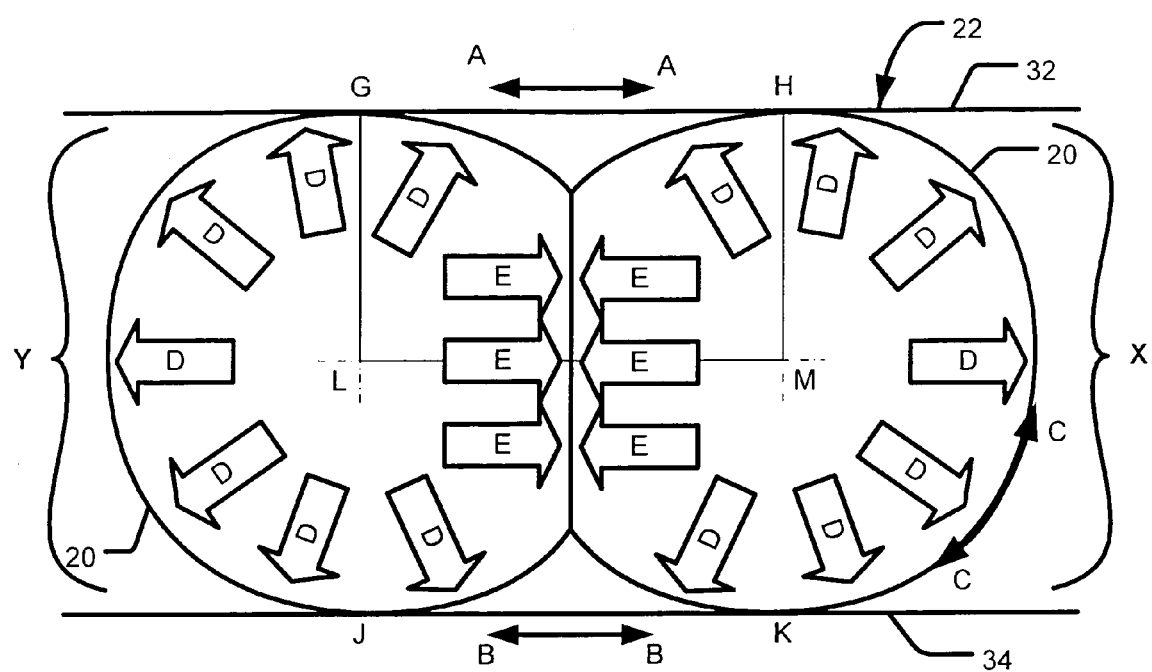
FIG. 2 is a spanwise cross-sectional view of a simple two-chamber structure embodying the principles of the present invention.
Figure 3:
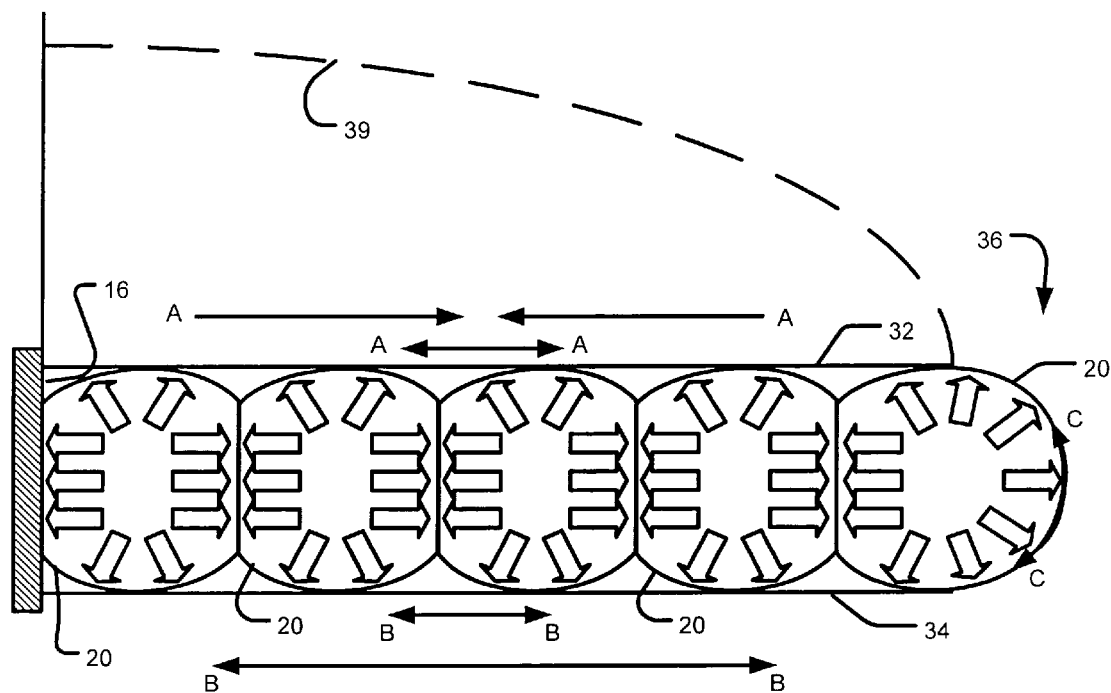
FIG. 3 is a spanwise cross-sectional view of the wing of FIG. 1, as seen along line 3—3 of FIG. 1.

As shown in FIGS. 2 and 3, the wing skin 22 includes a pair of opposing surfaces 32, 34 that bound the upper and lower surfaces of the array of chambers 20. The two opposing surfaces 32, 34 can come together at the end of the wing 10 at the wing tip 36. The wing tip also can be formed by attaching the upper and lower surfaces 32, 34 to a wing cap, which can have any shape, including the same shape as the chordwise (generally longitudinal) profile of the inflatable chambers 20. The wing tip also can be formed by connecting the upper and lower surfaces 32, 34 to the outermost chamber 36. In this configuration, a portion of the outermost chamber can be exposed to form the wing tip and is not contained within the envelope of the wing skin 22. In that case, the wing tip chamber must be constructed of a material suitable for outside exposure.

Both the wing skin 22 and the inflatable chambers 20 are formed of flexible material. The upper and lower wing surfaces 32, 34 typically include a flexible material that creates a smooth surface when the chambers 20 are inflated. When the wing is in a fully deployed configuration, the wing skin 22, supported by the inflated chambers 20, provides a primary lifting surface for non-ballistic flight. Such a wing structure also can be used for movable control and/or stabilization surfaces during ballistic flight as well, such as tail fins on a missile.

The wing skin 22 is attached to or otherwise binds the chambers 20 to maintain the desired spacing between the chambers that provides the inflated wing with its rigidity. The wing skin 22 is attached to at least two of the inflatable chambers 20, typically at least one chamber located at an end of the wing adjacent the fuselage 16 representing the wing root and at least one chamber located at a distal end of the wing representing the wing tip 36. The wing skin 22 also can be attached to the upper and lower surfaces of more than two inflatable chambers 20. When the chambers 20 are inflated, line contacts 35 (FIG. 1) are formed between each of the inflatable chambers and the wing skin 22 along the longitudinal periphery (chordwise in the illustrated embodiment) of the chambers. The inflatable chambers 20 thus act as ribs of the wing 10 to which the skin 22 is attached.

Attaching the skin 22 to the chambers 20 helps to keep the location of the upper and lower surfaces 32, 34 of the wing skin 22 located relative to the inflatable chambers. When the chambers 20 are inflated, the upper and lower surfaces 32, 34 conform to the outer shape of the array of chambers. While the wing skin 22 maintains the inflatable chambers 20 in a constrained volume, the inflatable chambers typically create tension in the upper and lower wing surfaces 32, 34, which helps to smooth the upper and lower wing surfaces that cover the chambers.

The rigidity of the structure provided by the present invention comes from the behavior of thin-walled volumes with substantially circular cross-sections. The spacing of these thin-walled volumes provides a relatively lightweight and highly collapsible structure that can be inflated to provide sufficient rigidity for the structure to act as a wing for an aerial vehicle. For example, a thin-walled sphere, subjected to an internal fluid pressure, will exhibit omni-directional tensile stresses in the thin walls. These tensile stresses follow the curvature of the sphere's radius. A cylinder, also subjected to internal fluid pressure, will also exhibit tensile stresses, generally referred to as hoop stresses, that follow the circumference of its curved sidewalls, similar to the thin-walled sphere. In the case of a closed end, thin-walled cylinder, there are complex stresses in the vicinity of the discs that cap the ends of the cylinder. If hemispheres cap the ends of the cylinder, however, the stresses are less complex and the strength of the structure is less dependent on the bending strength of the materials. For a pressurized thin-walled cylinder capped at its ends by thin-walled hemispheres, the walls are primarily loaded in tension. The inflatable wing 10 provided by the present invention has an array of chambers 20 that behave similar to the thin-walled cylinders capped by hemispheres, where the structural materials are primarily loaded in tension.

Turning back to FIGS. 2 and 3, in the inflatable structure provided by this invention, a plurality of these chambers 20 are placed side-by-side and are covered by the wing skin 22. Arrows are used in these figures to depict forces acting on the structure. FIG. 2 shows two circular chambers 20 subject to internal fluid pressure depicted by arrows D, which creates hoop stresses in the chambers as indicated by the circumferential arrows CC. The spacing of the chambers 20 is restricted by the attached upper and lower surfaces 32, 34 of the wing skin 22 such that when the chambers are inflated the distance between the center points of two adjacent chambers (L to M) is less than the sum of the perpendicular distances of the same center points to either the upper or lower wing surfaces 32, 34 (for example, L to G and M to H). Typically, for chambers 20 having circular cross-sections and the same cross-sectional diameters, this means spacing the chambers less than a diameter between the centers of adjacent chambers. As a result, when the chambers 20 are inflated, the cross-sectional shapes in the region of the largest radii are not truly circular but flattened on their sides that abut adjacent chambers.

This flattening of the chambers 20 is caused by their spacing and the tendency of adjacent chambers to expand under the internal pressure, represented by arrows D and E. The forces represented by arrows E are balanced, and therefore cancelling forces. With the forces represented by arrows E cancelling each other, the forces represented by the arrows D in areas X and Y are balanced and opposing, and therefore represent expansive forces that are balanced by tensile forces acting through the upper and lower surfaces 32, 34. The line or area contact in the flattened portion of the chambers 20 provides an area for the pressure in each chamber to exert the force on, as depicted by the arrows E. The sidewalls of the adjacent chambers 20, because of their spacing, press into each other. The wing surfaces 32, 34 are stressed in tension, as depicted by the arrows at AA and BB and this tension opposes the expansive forces and holds the chambers 20 together.

Figure 4:
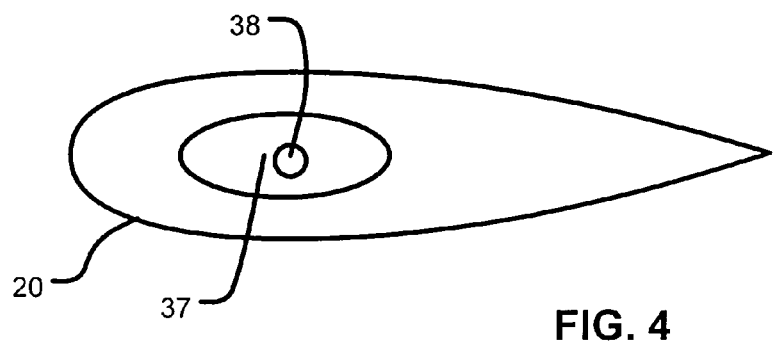
FIG. 4 is a chordwise cross-sectional view of a chamber of the wing of FIG. 1, as seen along line 4—4 of FIG. 1.

As three-dimensional objects, the contact between the chambers 20 typically is an area 37 of contact or a contact surface, as shown in the chordwise section of FIG. 4. The exact size and shape of this contact area 37 will vary according the size and shape of the inflatable chambers 20. There is a relationship between shear stiffness and the length of the line of contact versus expansion pressure and material modulus as these effect the geometry of the path of shear stresses.

Although each chamber 20 typically has a generally circular cross-sectional shape, the cross-sectional radii can be distributed such that the chambers 20 have any shape in their longitudinal section. This longitudinal dimension of the chambers 20 typically, although not necessarily, is aligned with the chordwise direction in a wing, as shown in FIG. 1. A spanwise orientation also would be possible. Such an orientation has limited application, however, since a supporting surface, such as the fuselage, is needed to provide a reaction force. If the radii are distributed along a straight line, the resulting volume of the chamber 20 is an axisymmetric shell. If the radii are distributed along a curved path, the resulting volume is not axisymmetric, but still has substantially circular cross-sectional shapes. Where the radii distribution follows the curved path of an airfoil shape, an airfoil chamber 20 results when the chambers 20 are inflated. The cross-sectional shape of the chambers 20 is not limited to a circular shape. Any shape can be used as long as the chambers can be spaced such that expansive forces from the internal pressure provide a contact area that cooperates with the wing skin tension to stiffen the wing structure, but a circular cross-sectional shape generally is optimal.

In the case of equal pressures in all chambers 20, all of the forces E caused by pressures acting on the contact surfaces will cancel each other. In the rightmost chamber (X, at the wing tip, for example), there is an unbalanced force D acting to the right from the center of the arc and a similar but opposing force in the leftmost chamber (Y, at the wing root, for example) acting to the left. These forces are restrained by the tensile stresses in the wing skin 22. Increasing the internal pressure will increase the wing skin tension.

The wing also tends to bend when subject to spanwise lifting forces. In FIG. 3, a rectangular wing plan is assumed in the illustrated cross-section. This plan form will produce an elliptical spanwise lift distribution as indicated graphically by the lift line 39. As in all beam loading problems, the bending effect of the applied load causes compression in the upper skin and tension in the lower skin. The positive bending effect of the applied load causes compression or negative tension in the upper surface 32 and tension in the lower surface 34, as represented by horizontal arrows. These forces act in conjunction with the spanwise tension in the wing skin 22, represented by horizontal arrows AA and BB, due to the internal fluid pressure in the chambers 20. On the lower surface 34, these stresses add together and result in increased tension. On the upper surface 32, however, the bending compression subtracts from the expansive tension. As long as the expansive pressure tension is greater than the bending compression, the net stress in the upper surface 32 will be tension. Since the skins are made of a flexible material they possess substantial tensile strength but essentially zero compressive strength. Flight loads according to the required mission profile combine with structural configuration, flight controls and component materials to set the detail requirements for the wing structure. Higher elastic modulus material and higher tensile strengths will reduce deformations and improve stiffness. In most cases, stiffness and deflection requirements will determine what the internal fluid pressures must be, and what material characteristics are required.

The bending effect also produces shear forces between adjacent chambers 20. The paths of shear stresses resemble the forty-five degree lines of stress in the shear web of common simple beams. Application of upward (lift) forces at the right end of this wing will cause compressive (reduced tensile) stresses in the upper surface and increased tensile stresses in the lower surface. Substantial internal pressures will retain the circular shape of the arc segments of these paths forcing the shearing stresses to follow these arcs. Increased shearing forces or reduced internal pressure will allow distortion of the geometry. Pressure and material modulus of elasticity can be used to limit this distortion and control deflections under flight loads.

As the spanwise tensile stress at any point on the root edge of the wing skin is proportional to the vertical distance from the chordwise neutral axis of the root chamber, maximum stresses will occur near the thickest portion of the wing. Wing skin mechanical properties can account for the variation in stresses along the root edge of the wing 10. Non-isotropic materials, such as woven textiles or oriented strand composites can be used to strengthen the overall wing structure in this area. The chordwise lines of contact of the wing skin with the chambers is shown in FIG. 1. Maintaining the required internal pressure and resulting tension in the wing skin will assure that the wing surfaces contacted by the airflow remain fair and smooth.

Since the skin 22 is constructed of flexible material, the upper and lower surfaces 32, 34 possess substantial tensile strength but essentially no compressive strength. Flight loads according to the required mission profile, combined with the structural configuration of the wing, determine the structural requirements of the wing structure. Higher elastic modulus material and higher tensile strengths will reduce deformations and improve stiffness. In most cases, the stiffness and deflection requirements will determine what the internal fluid pressures must be and what material characteristics are required for a particular application of the wing structure.

The internal pressure is provided by a fluid that is distributed from a source (not shown) in the fuselage. The manifold 24 is connected to one or more chambers 20 to distribute the pressurized fluid to the chambers 20. If the manifold 24 is not connected to each chamber 20, one or more apertures 38 in the chamber walls between adjacent chambers 20 in the contact areas 37, as shown in FIG. 4, can be used to distribute the pressurized fluid. A spanwise flexible tube, for example, can be used to provide pressurized fluid for inflating the chambers 20. A regulator (not shown) can be used with the manifold 24 to modulate the pressure to provide different pressures to different chambers. The manifold 24 can be placed in any manner so long as it can distribute pressure to the inflatable chambers 20, although generally the manifold 24 should be within the wing envelope defined by the wing skin 22.

Pressurized fluid for inflating the chambers 20 can be provided by a compressor or a chemical reaction, for example, depending on the individual application. Pressurized fluid can be provided by any means that provides suitable fluid pressure and volume for the intended application. Pyrotechnic gas generators, as are generally known and available within the art, also can be used to supply pressure in the chambers 20. Pyrotechnic gas generators are usually very small for the amount of gas that they produce. Chemical reactions could also use liquids that produce flexible foams although this method probably would require more time than the other methods mentioned.

It is consistent with this invention for a wing to be fabricated with a non-rectangular plan form, non-uniform airfoils or spanwise twist (washout/in) as in the case of traditional wing structures. These features can be implemented by systematically varying the chord length of the chambers 20, which act as ribs, to produce a tapered or curved edge plan form and by manipulation of the attachment of the skin materials. The chambers also can be oriented at varying pitch angles to effect wing twist. Structural characteristics also can be tailored by systematically varying the spacing of the chambers 20 relative to their individual radii in the contact areas. This will change their shear lines of stress and can be optimized to minimize distortion due to shear stresses.

It is also consistent with this invention to stack wing panel assemblies end to end spanwise with separate internal fluid pressurization systems for each panel. A means of detaching the outer panel in flight also could be provided, thereby decreasing both wing area and drag and providing the potential for increased maximum speed potentials. Such panels can be mechanically attached and then detached during flight. In addition to mechanical attachments, a wire can be embedded against the wing skin 22 at the juncture of the panels and then heated by an electrical current to melt the skin material and separate the outer panel from the main aircraft.

It would also be possible to tailor the materials of the wing structure, especially in the case of woven or oriented-strand textiles, such that modulating the internal fluid pressure would alter the aerodynamic shape of the wing. For example, an asymmetric orientation of wing skin fibers could cause twisting of the wing assembly proportional to the pressure. This could be used for roll control in lieu of traditional ailerons or to bias stall propagation behavior at high angles of attack while not suffering the excess drag of traditional wing tip washout during moderate or lower angles of attack.

In the case of the structure of the chambers 20, different orientations of fibers on the upper 32 versus lower 34 surfaces could allow pressure to effect camber. For example, fabric on the upper half circumference of a chamber set at a forty-five degree bias would translate some of the hoop stresses into a longitudinal expansion stress, while fibers oriented orthogonally to span and chord on the lower half circumference would resist longitudinal expansion. The net effect would be to increase camber proportional to pressure. This would allow for variable airfoil sections during slow flight versus high-speed flight without the need for flaps, slats, or other traditional high-lift devices. The upper and lower surfaces 32, 34 can include different materials to account for different stresses that the aerial vehicle 12 may experience during flight.

Using orthogonally oriented fibers where the elasticity of the longitudinal fibers is greater than the hoop-wise fibers could have a similar effect. A similar effect also could be had by using isotropic materials, such as plastic films or sheets, where the elasticity of the upper surface material has greater elasticity than that of the lower surface. These effects could also be varied spanwise to effect different geometry modulation in various spanwise positions. For example, if only the outermost few chambers 20 have variable camber features, then pressure modulation would cause an aileron effect. Pressure modulation could be applied to the entire set of wing chambers 20 or by separate supplies to an individual chamber or a group of chambers.

There are a wide variety of materials that are suitable for implementing a inflatable wing 10 as provided by the invention. These include most common composite materials, such as fiberglass, aramid (Kevlar™), graphite, Spectra™ and others. There are also various plastic materials such as nylon, polyester, polyamide (Kapton™), Mylar™ and others that can be used. In general, any material that is very thin relative to its other dimensions, such as aluminum foil, is a candidate material. Various combinations of these and other materials, such as fibers that are woven into cloths, oriented-strand products or non-oriented strand matting, can be used to implement a wing structure 10 according to this invention.

In the case of fibers that are woven into cloths or oriented-strand products or even non-oriented strand matting, since these materials generally are porous, they typically would be sealed by another material. Any fibrous materials can be made non-porous by molding them into sheet form with a rubber-like material. For example, woven aramid fabric could be impregnated with urethane synthetic rubber to make it non-porous. A further example is graphite cloth impregnated with silicone rubber.

Structures according to this invention also could be built by molding fibers into molds with elastomeric materials in liquid form and subsequently cured to a solid, or thermoplastic materials could be laminated to fibrous materials in the desired shapes. Any of a wide variety of fabricating and manufacturing methods and processes could be used to form the structures of this invention.

The inflatable wing 10 of the present invention is collapsible such that it can be folded and stored within the fuselage 26 of an aerial vehicle 12. The storage compartment within the fuselage 26 can also have a cover to protect the wing during storage, launch or ballistic flight. When non-ballistic flight is desired, the cover can be removed; releasing the wing 10 from its stowed configuration in the storage compartment.

Once released, the wing 10 can be inflated with internal pressure, such as with a pressurized gas. The pressurized gas can be distributed to the chambers 20 via a flexible manifold 24. All of the chambers 20 can be inflated at the same rate or, alternatively, the chambers can be selectively inflated based upon desired flight and deployment characteristics. Once inflated, the chambers form a rigid wing structure. Further, the manifold 24 and pressurization system also can be used to regulate the internal pressure within the wing 10 during flight.

If the structure provided by this invention is used as the wing of an aircraft, then so long as compressive skin stresses or bending forces due to aerodynamic and inertial loads do not exceed the tension caused by fluid inflation pressure, then the assembly will remain substantially stable. Further, similar wing structures 10 can be used for main wings as well as secondary wings or movable control surfaces on an aircraft, a missile or any other aerial vehicle.

Moreover, the principles employed to make such a stable wing structure can be employed to make other inflatable structures, such as inflatable beams, with improved stability and rigidity over current inflatable structure designs.

The present invention also provides a structure with superior packaging efficiency without compromising airframe performance. The compact nature of the inflatable wing reduces the stowage volume of the wing; thereby improving the volumetric efficiency of the overall package within which the wing is stowed.

Although the invention has been shown and described with respect to an illustrated embodiment, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer that performs the specified function (i.e., that is functionally equivalent), even though not structurally equivalent to the disclosed structure that performs the function in the herein illustrated embodiments of the invention.

What is claimed is:

1. An inflatable wing, comprising:
   an array of inflatable chambers arranged side-by-side in a spanwise direction; and at least two opposing surfaces bounding the array;
   wherein at least two of the inflatable chambers are attached to each of the opposing surfaces at attach points, each chamber has a generally circular cross-section when individually inflated; and the chambers are spaced such that when the chambers are inflated, over at least a portion of their length in a chordwise direction transverse the spanwise direction the spanwise distance between the attach points of any two adjacent chambers on one of the surfaces is less than the sum of the distances from the center point of each chamber to the extent of the chamber when the chamber is separately inflated, whereby when all of the chambers are inflated tension is applied in the surfaces that counteracts the expansive pressure in the chambers to form a rigid structure, within which each chamber abuts at least one adjacent chamber to form an area contact surface.

2. An inflatable wing as set forth in claim 1, wherein each chamber has the same spanwise circular cross-sectional shape and cross-sectional diameter when separately inflated and the distance between the attach points of two adjacent chambers is less than the diameter.

3. An inflatable wing as set forth in claim 1, wherein at least one chamber, when separately inflated, has a generally circular spanwise cross-sectional area that varies along a length dimension in the chordwise direction to form an aerodynamically desirable shape.

4. An inflatable wing as set forth in claim 3, wherein the aerodynamically desirable shape is an airfoil.

5. An inflatable wing as set forth in claim 1, wherein the attach points form a line contact between the chambers and each of the opposing surfaces.

6. An inflatable wing as set forth in claim 1, wherein the distal ends of the opposing surfaces come together to form a wing tip.

7. An inflatable wing as set forth in claim 1, wherein a root end of the opposing surfaces is connected to an airframe structure.

8. An inflatable wing as set forth in claim 1, wherein the inflatable chambers and the opposing surfaces are constructed of a flexible material.

9. An inflatable wing as set forth in claim 8, wherein the inflatable chambers are constructed of more than one material.

10. An inflatable wing as set forth in claim 8, wherein the opposing surfaces are constructed of more than one material.

11. An inflatable wing as set forth in claim 8, wherein the flexible material is a nonporous fabric, plastic film, woven textile, an oriented-strand composite, non-oriented-strand composite or any combination thereof.

12. An inflatable wing as set forth in claim 1, wherein the wing includes a manifold for distributing fluid to the array of inflatable chambers.

13. An inflatable wing as set forth in claim 12, wherein the manifold includes a flexible tube.

14. An inflatable wing as set forth in claim 1, wherein the wing includes multiple panels, each panel having at least two chambers.

15. An inflatable wing as set forth in claim 14, wherein the multiple panels are stacked end-to-end.

16. An inflatable wing as set forth in claim 14, wherein the multiple panels are mechanically connected.

17. An inflatable wing as set forth in claim 14, wherein at least one of the multiple panels is detachable from another panel.

18. An inflatable wing as set forth in claim 17, wherein the multiple panels are connected by a wire embedded in the two opposing surfaces.

19. An inflatable wing as set forth in claim 18, wherein when the wire is heated with an electrical current opposing surfaces melt and thereby separate at least one of the multiple panels.

20. An aerial vehicle having a fuselage and as set forth in claim 1 mounted to the fuselage.

21. An aerial vehicle comprising having a fuselage and a wing mounted to the fuselage and having at least one of a secondary wing or a control surface formed of a wing as set forth in claim 1.

22. A method of deploying an inflatable wing comprising the following steps:
   providing an inflatable wing as set forth in claim 1, and inflating the chambers.

23. A method as set forth in claim 22, wherein the inflating step includes inflating the chambers with a gas or a foam.

24. A method as set forth in claim 23, wherein the inflating step includes providing internal pressure to the chambers by at least one of a compressor, a chemical reaction, a pyrotechnic gas generator or a liquid that produces a flexible foam.

25. A method of deploying an inflatable wing as set forth in claim 24 further comprising the step of selectively modulating the pressure in respective chambers.

26. An aerial vehicle, comprising:
   a fuselage and at least one inflatable wing extending from the fuselage in a spanwise direction, the wing including an array of inflatable chambers having an airfoil shape in a chordwise cross-section, each chamber having a length dimension in a chordwise direction and a generally circular spanwise cross section transverse the chordwise direction; and at least two opposing surfaces bounding the array;

wherein each of the inflatable chambers are attached to the opposing surfaces at attach points, and the chambers are spaced such that the distance between the attach points of any two adjacent chambers on at least one of the opposing surfaces is less than the sum of the perpendicular distance from the center point of each chamber to one of the opposing surfaces, and wherein a manifold distributes internal pressure to the inflatable chambers by at least one of a compressor, a chemical reaction, a pyrotechnic gas generator or a liquid that produces a flexible foam.

27. An aerial vehicle including at least one inflatable wing formed from an array of inflatable chambers arranged side-by-side in a spanwise direction and means for maintaining the array of chambers with a particular spacing, the means for maintaining the spacing including a member attached to an outer surface of at least two chambers whereby inflating the chambers creates tension in the member that prevents at least one chamber from achieving the shape it would achieve if separately inflated, thereby creating a wing having structural rigidity in a spanwise direction.

28. An aerial vehicle as in claim 27, wherein the means for maintaining the array of inflatable chambers is two opposing surfaces, each of which is defined by respective members attached to an outer surface of at least two chambers.

29. An aerial vehicle as in claim 28, including means for inflating the array of inflatable chambers.

30. An inflatable beam, comprising:

an array of inflatable chambers arranged side-by-side in a spanwise direction; and at least two opposing surfaces extending over respective opposing sides of the array of inflatable chambers;

wherein at least two of the inflatable chambers are attached to the opposing surfaces at attach points, and the chambers are spaced such that when at least two chambers are inflated, the opposing surfaces prevent at least one of the chambers from achieving the shape it would have achieved if separately inflated.

31. An inflatable beam as set forth in claim 30, wherein the chambers have a circular shape in spanwise cross-section when separately inflated, and respective attach points of adjacent chambers to one of the surfaces are spaced apart in a spanwise direction a distance that is less than the sum of their radii.

32. An inflatable beam as set forth in claim 30, wherein each chamber has a first shape when separately inflated and a second shape different from the first shape when an adjacent chamber also is inflated.

* * * * *